(12) United States Patent
Royyuru (10) Patent No.: US 8,924,300 B2
(45) Date of Patent: Dec. 30, 2014

(54) SYSTEMS AND METHODS FOR PROCESSING PAYMENT TRANSACTIONS

(71) Applicant: First Data Corporation, Greenwood Village, CO (US)

(72) Inventor: Vijay Kumar Royyuru, Norristown, PA (US)

(73) Assignee: First Data Corporation, Greenwood Village, CO (US)

( * ) Notice: Subject to any disclaimer, the term of this patent is extended or adjusted under 35 U.S.C. 154(b) by 19 days.

(21) Appl. No.: 13/627,654

(22) Filed: Sep. 26, 2012

(65) Prior Publication Data

US 2013/0080328 A1   Mar. 28, 2013

Related U.S. Application Data

(60) Provisional application No. 61/539,206, filed on Sep. 26, 2011.

(51) Int. Cl.
*G06Q 40/00* (2012.01)
*G06Q 20/32* (2012.01)
*G06Q 30/00* (2012.01)
*G06Q 40/02* (2012.01)

(52) U.S. Cl.
CPC ............ *G06Q 20/3278* (2013.01); *G06Q 30/00* (2013.01); *G06Q 40/02* (2013.01)
USPC .......................................................... 705/44

(58) Field of Classification Search
CPC .... G06Q 20/3278; G06Q 30/00; G06Q 40/02
USPC .......................... 705/35, 39, 41, 44
See application file for complete search history.

(56) References Cited

U.S. PATENT DOCUMENTS

| 5,566,327 | A  | * | 10/1996 | Sehr ........................................ 1/1 |
| 6,505,772 | B1 | * | 1/2003 | Mollett et al. ................. 235/379 |
| 7,119,659 | B2 |   | 10/2006 | Bonalle et al. |
| 8,332,272 | B2 |   | 12/2012 | Fisher |
| 8,485,441 | B2 | * | 7/2013 | Brooks .......................... 235/380 |
| 2002/0062249 | A1 | * | 5/2002 | Iannacci ........................ 705/14 |

(Continued)

OTHER PUBLICATIONS

Non-final Office Action for U.S. Appl. No. 13/627,665 mailed Mar. 15, 2013.

(Continued)

*Primary Examiner* — Kenneth Bartley
(74) *Attorney, Agent, or Firm* — Sutherland Asbill & Brennan LLP (57) ABSTRACT

Embodiments of the disclosure can include systems and methods for processing transactions. In one embodiment, a computer-implemented method for processing proposed transactions can be provided. The method can include storing, by a service provider system comprising one or more computers, one or more issuer rules associated with the applicability of one or more payment accounts to proposed transaction; receiving, by the service provider system from a merchant computer, information associated with a proposed transaction, the information comprising one of an identification of a payment account or an identification of a consumer payment device; evaluating, by the service provider system utilizing the one or more issuer rules, the proposed transaction; and determining, by the service provider system based at least in part upon the evaluation, at least one of (i) a payment account to utilize in association with the proposed transaction or (ii) whether the proposed transaction will be approved or denied.

14 Claims, 4 Drawing Sheets

(56) References Cited

U.S. PATENT DOCUMENTS

| | | | |
|---|---|---|---|
| 2004/0015435 A1* | 1/2004 | Solomon et al. | 705/39 |
| 2004/0049452 A1* | 3/2004 | Blagg | 705/39 |
| 2005/0077350 A1* | 4/2005 | Courtion et al. | 235/380 |
| 2006/0000900 A1* | 1/2006 | Fernandes et al. | 235/380 |
| 2006/0208060 A1* | 9/2006 | Mendelovich et al. | 235/379 |
| 2006/0229974 A1* | 10/2006 | Keithley et al. | 705/38 |
| 2006/0242046 A1* | 10/2006 | Haggerty et al. | 705/35 |
| 2007/0203832 A1* | 8/2007 | Babi et al. | 705/39 |
| 2008/0203153 A1* | 8/2008 | Keithley et al. | 235/380 |
| 2008/0208760 A1* | 8/2008 | Keithley | 705/75 |
| 2009/0144165 A1* | 6/2009 | Dickelman | 705/18 |
| 2009/0164320 A1* | 6/2009 | Galit | 705/14 |
| 2010/0070354 A1* | 3/2010 | Fordyce et al. | 705/14.3 |
| 2011/0078081 A1 | 3/2011 | Pirzadeh et al. | |
| 2012/0109764 A1 | 5/2012 | Khan et al. | |
| 2012/0143703 A1 | 6/2012 | Wall et al. | |
| 2012/0296770 A1 | 11/2012 | Lin et al. | |
| 2013/0040571 A1 | 2/2013 | Wall et al. | |
| 2013/0046643 A1 | 2/2013 | Wall et al. | |
| 2013/0080219 A1 | 3/2013 | Royyuru | |
| 2013/0080236 A1 | 3/2013 | Royyuru | |
| 2013/0080239 A1* | 3/2013 | Okerlund | 705/14.33 |
| 2013/0080273 A1 | 3/2013 | Royyuru | |
| 2013/0080329 A1 | 3/2013 | Royyuru | |

OTHER PUBLICATIONS

Final Office Action for U.S. Appl. No. 13/627,665 mailed Aug. 7, 2013.

DigiMo Pioneers First True Mobile Payment Solution, M2 Presswire, NA, May 5, 2011.

Notice of Allowance for U.S. Appl. No. 13/627,665 mailed Oct. 25, 2013.

* cited by examiner

SYSTEMS AND METHODS FOR PROCESSING PAYMENT TRANSACTIONS

RELATED APPLICATION

This application claims priority to U.S. Ser. No. 61/539,206, titled "Systems and Methods for Processing Payment Transactions," filed on Sep. 26, 2011, the contents of which are incorporated herein by reference.

FIELD OF THE DISCLOSURE

Embodiments of the disclosure relate generally to the processing of payment transactions, and more specifically to the evaluation of payment transactions in which payment processing parameters are decoupled from a payment account issuer.

BACKGROUND OF THE DISCLOSURE

A wide variety of different payment devices and/or payment accounts, such as credit card accounts, debit accounts, and/or stored value accounts, are utilized to facilitate transactions. Payment accounts may include both closed loop and open loop payment accounts. A closed loop payment account, such as a private label credit card account or a prepaid merchant-specific account, can only be utilized as designated locations and/or in association with designated merchants. For example, a merchant-specific card associated with a merchant-specific account can only be utilized at merchant locations associated with the merchant. Open loop payment accounts can typically be utilized at any location that accepts the payment account. For example, a Visa or Mastercard payment account may be utilized at any accepting merchant.

Regardless of the type of payment account, an issuer of the payment account may wish to establish various rules and/or parameters associated with the payment account's use. For example, a merchant may wish to allow a merchant-specific payment account to be utilized in association with other merchant in the event that certain criteria are met. Additionally, a consumer utilizing a payment account may wish to establish various rules and/or parameters associated with the payment account's use. Accordingly, there is an opportunity for improved systems and methods for processing transactions in which payment processing parameters are decoupled from a payment account issuer.

SUMMARY

Embodiments of the disclosure can include systems and methods for processing transactions. Certain embodiments can provide evaluation of payment transactions in which payment processing parameters are decoupled from a payment account issuer. In one embodiment, a computer-implemented method for processing proposed transactions can be provided. The method can include storing, by a service provider system comprising one or more computers, one or more issuer rules associated with the applicability of one or more payment accounts to proposed transaction; receiving, by the service provider system from a merchant computer, information associated with a proposed transaction, the information comprising one of an identification of a payment account or an identification of a consumer payment device; evaluating, by the service provider system utilizing the one or more issuer rules, the proposed transaction; and determining, by the service provider system based at least in part upon the evaluation, at least one of (i) a payment account to utilize in association with the proposed transaction or (ii) whether the proposed transaction will be approved or denied.

In at one aspect of an embodiment, the computer-implemented method can further include storing, by the service provider system, one or more consumer rules associated with the applicability of one or more payment accounts to proposed transactions, wherein evaluating the proposed transaction comprises evaluating the proposed transaction utilizing the one or more consumer rules.

In one embodiment, a system for processing proposed transactions can be provided. The system can include at least one memory configured to store computer-executable instructions; and at least one processor configured to access the at least one memory and execute the computer-executable instructions. The computer-executable instructions can be operable to store one or more issuer rules associated with the applicability of one or more payment accounts to proposed transaction; receive information associated with a proposed transaction, the information comprising one of an identification of a payment account or an identification of a consumer payment device; evaluate, utilizing the one or more issuer rules, the proposed transaction; and determine, based at least in part upon the evaluation, at least one of (i) a payment account to utilize in association with the proposed transaction or (ii) whether the proposed transaction will be approved or denied.

In one aspect of an embodiment, the system can further include computer-executable instructions operable to store one or more consumer rules associated with the applicability of one or more payment accounts to proposed transactions, wherein evaluating the proposed transaction comprises evaluating the proposed transaction utilizing the one or more consumer rules.

In another embodiment, a method for processing proposed transactions can be provided. The method can include storing one or more issuer rules associated with the applicability of one or more payment accounts to proposed transaction; receiving information associated with a proposed transaction, the information comprising one of an identification of a payment account or an identification of a consumer payment device; evaluating, utilizing the one or more issuer rules, the proposed transaction; and determining, based at least in part upon the evaluation, at least one of (i) a payment account to utilize in association with the proposed transaction or (ii) whether the proposed transaction will be approved or denied.

In one aspect of an embodiment, the method can further include storing one or more consumer rules associated with the applicability of one or more payment accounts to proposed transactions, wherein evaluating the proposed transaction comprises evaluating the proposed transaction utilizing the one or more consumer rules.

BRIEF DESCRIPTION OF THE FIGURES

FIG. 4 illustrates a flow diagram of another example process for processing a proposed payment transaction and selecting a payment account to be utilized in association with

DETAILED DESCRIPTION OF CERTAIN EMBODIMENTS OF THE DISCLOSURE

Various embodiments of the disclosure are directed to the processing of payment transactions in which rules, restrictions, and/or parameters associated with a payment account have been decoupled from an issuer of the payment account and/or a payment device (e.g., a payment card, a payment application, wallet information, etc.) associated with the payment account. In one example embodiment, restrictions and/or preferences associated with a payment account may be stored by a service provider. For example, an issuer may provide one or more restrictions and/or parameters to the service provider, such as parameters associated with approved merchants, parameters associated with approved merchant types and/or product types, geographical parameters, transaction amount parameters, and/or temporal parameters. As another example, a consumer associated with the payment account may provide one or more consumer parameters and/or preferences to the service provider, such as preferences for utilizing the payment account in association with various merchants, merchant types, transaction amounts, and/or other criteria. As desired, restrictions and/or parameters may be stored in association with any number of payment accounts.

Following the storage of restrictions and/or parameters associated with one or more payment accounts, information associated with a proposed transaction may be received by the service provider. The service provider may evaluate the proposed transaction and apply any number of the stored restrictions and/or parameters. In this regard, the service provider may determine whether a particular payment account may be utilized for the proposed transaction. Additionally, in certain embodiments, the service provider may select a payment account to utilize in association with the proposed transaction.

As a result of the decoupling of the payment account processing rules, a wide variety of flexibility may be provided. As one example, a merchant issuer may issue to a consumer a payment device (e.g., merchant-specific card, merchant-specific wallet application, etc.) associated with a closed-loop payment account; however, the merchant may allow the payment device and associated payment account to be utilized at one or more other merchants and/or merchant types. For example, a department store may allow a payment account to be utilized at various grocery stores. When the consumer attempts to utilize the payment account to facilitate a grocery store transaction, the service provider may receive information associated with the proposed transaction and apply merchant issuer rules to the proposed transaction. The service provider may then determine that the payment account may be utilized for the grocery store transaction, and the service provider may approve the proposed transaction for routing or other communication to a processing entity, such as an issuer or financial institution system, for clearance and/or settlement.

As another example, an issuer may specify at the service provider various restrictions and/or parameters associated with other merchants, types of merchants (or other criteria). Additionally, the issuer may offer a wide variety of incentives for utilizing a payment account in certain situations. For example, an issuer may offer an increased reward incentive (e.g., cash back, coupons, etc.) in the event that a consumer uses the payment account for transactions at a particular merchant or merchant type (e.g., grocery stores, gas stations, etc.). The consumer may then provide processing preferences to the service provider. For example, the consumer may specify that the payment account should be utilized for transactions involving the particular merchant or merchant type. Subsequently, during the processing of a proposed transaction, the service provider may utilize the stored preferences and/or parameters in order to select the payment account as a payment account to utilize for the proposed transaction. As desired, the service provider may additional determine or identify the applicability of an issuer incentive for the proposed transaction. The service may then direct the routing or communication of the proposed transaction to a suitable processing entity associated with the selected payment account.

Embodiments of the disclosure now will be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

System Overview

Figure 1:
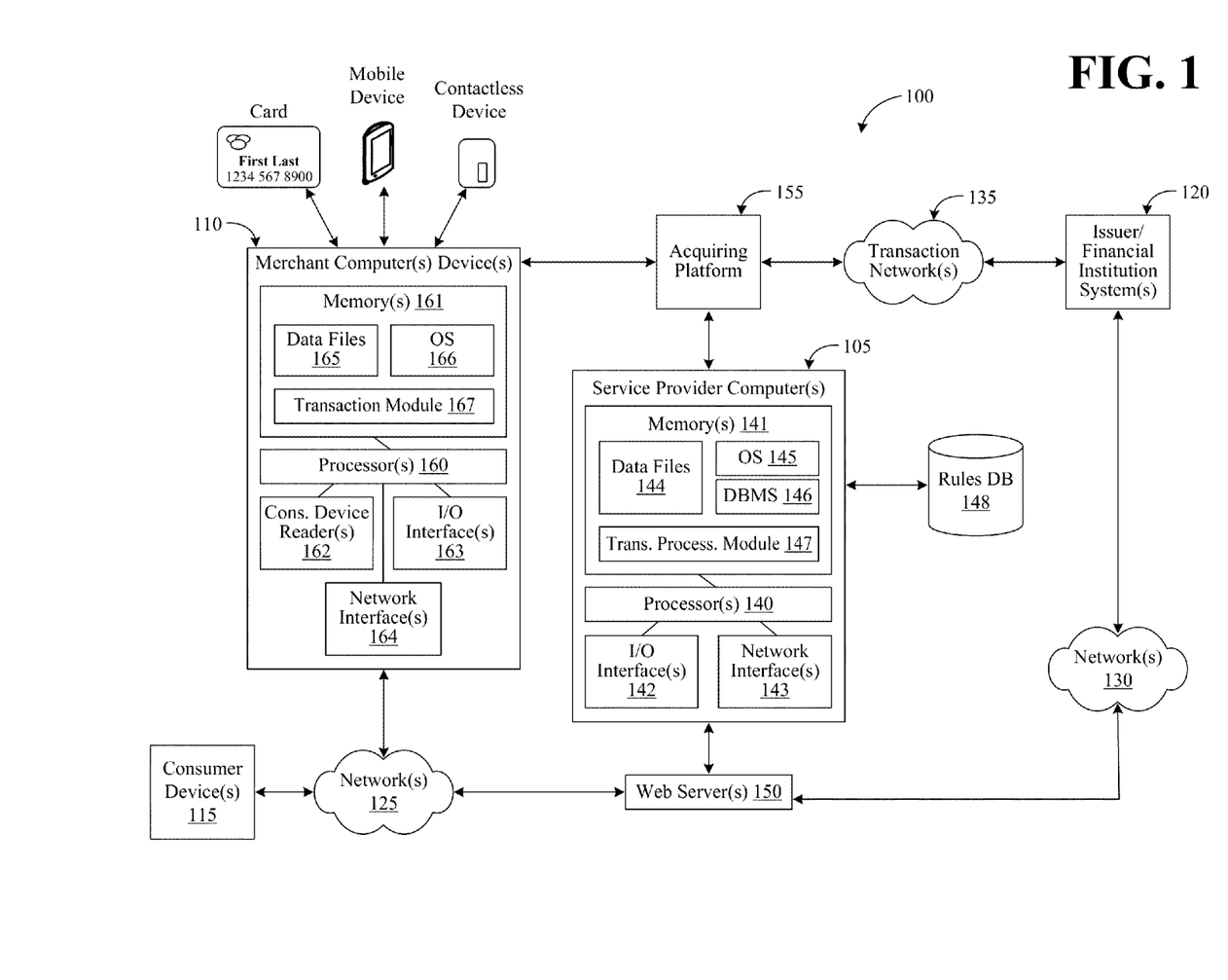
FIG. 1 illustrates a block diagram of an example system that may be utilized in accordance with various embodiments of the disclosure.

FIG. 1 represents a block diagram of an example system 100 for providing transaction processing services, according to one embodiment of the disclosure. The system 100 may facilitate the decoupling of payment account processing parameters from a payment account issuer and/or from a payment device. As shown in FIG. 1, the system may include one or more service provider computers 105 associated with a transaction processing service provider, one or more merchant computers and/or merchant devices (collectively referred to as merchant computers 110), one or more consumer devices 115, and/or one or more issuer and/or financial institution system 120. Any number of suitable networks, such as the illustrated networks 125, 130 and transaction networks 135, may facilitate communication between various components of the systems. Each of these components will now be discussed in further detail.

First, each service provider computer 105 may include any number of processor-driven devices, including but not limited to, a server computer, a mainframe computer, one or more networked computers, a desktop computer, a personal computer, a laptop computer, a mobile computer, or any other processor-based device. A service provider computer 105 may utilize one or more processors 140 to execute computer-readable instructions that facilitate the storage and/or management of various rules, preferences, and/or parameters associated with evaluating proposed transactions. Additionally, the service provider computer 105 may utilize the one or more processors 140 to execute computer-readable instructions that facilitate the processing of a proposed transaction. As a result of executing these computer-readable instructions, a special purpose computer or particular machine may be formed that facilitates the decoupling of transaction processing rules and/or parameters.

In addition to having one or more processors 140, the service provider computer 105 may further include one or more memory devices 141, input/output ("I/O") interface(s) 142, and/or network interface(s) 143. The memory 141 may be any computer-readable medium, coupled to the processor(s) 140, such as random access memory ("RAM"), read-only memory ("ROM"), and/or removable storage devices. The memory 141 may store a wide variety of data files 144 and/or various program modules, such as an operating system ("OS") 145, a database management system ("DBMS") 146, and/or a transaction processing module 147. The data files 144 may include any suitable data that facilitates the operation of the service provider computer 105 and/or interaction of the service provider computer 105 with one or more other components of the system 100. For example, the data files 144 may include card issuer identification information, merchant identification information, consumer identification information, data utilized to communicate with the card issuers, merchants, and/or consumers, data that facilitates the storage of transaction processing rules, and/or data that facilitates the processing of a proposed transaction. The OS 145 may be suitable module that facilitates the general operation of the service provider computer 105, as well as the execution of other program modules. For example, the OS may be, but is not limited to, Microsoft Windows®, Apple OSX™, Unix, a mainframe computer operating system (e.g., IBM z/OS, MVS, OS/390, etc.), or a specially designed operating system. The DBMS 146 may be a suitable program module that facilitate management of the data files 144, data stored in the memory 141, and/or data stored in one or more separate databases, such as one or more transaction processing rules databases 148.

The rules databases 148 may be configured to store a wide variety of rules that may be utilized to evaluate proposed transactions, including but not limited to, payment account issuer rules and/or preferences, merchant rules and/or preferences, and/or consumer rules and/or preferences. In certain embodiments, one or more host modules may be associated with the service provider computer 105, and the host modules may facilitate interaction with other components of the system 100. For example, one or more Web servers 150 may be provided, and the Web servers 150 may facilitate the presentation of any number of suitable graphical user interfaces to collect rules from issuer/financial institution systems 130, merchant computers 110, and/or consumer devices 115. Other example host modules may facilitate inter-process communications and/or other types of communications in order to facilitate the receipt of processing rules and/or preferences. Yet other example host modules may facilitate the receipt of proposed transactions to be processed.

A wide variety of suitable processing rules may be utilized as desired in various embodiments of the disclosure. In certain embodiments, issuer rules may be utilized. An issuer, which may also be a merchant, may be an entity that issues and/or sponsors a payment account. A wide variety of different types of payment accounts may be issued, such as credit accounts, debit accounts, and/or stored value accounts. Additionally, an issued payment account may be an open loop payment account that may be utilized in association with a wide variety of merchants. Alternatively, an issued payment account may be a closed loop payment account (e.g., a merchant-specific payment account, a closed loop prepaid card, etc.) that would conventionally be intended for use at only designated merchant locations and/or within a predefined network. Embodiments of the disclosure may facilitate the decoupling of transaction processing rules from the issuer. As a result, it may be possible to utilize a closed loop payment account outside of a predefined network. Additionally, a wide variety of other parameters may be utilized in association with open loop and closed loop accounts.

In certain embodiments, an issuer may define one or more rules and/or parameters that will be utilized by the service provider to process a proposed transaction. Examples of suitable rules include, but are not limited to, merchant rules, merchant type or merchant category code ("MCC") rules, product type rules, geographical rules, transaction amount and/or other monetary amount rules, temporal rules, and/or various incentive rules. Example merchant rules specify merchants and/or groups of merchants for which proposed transactions will be allowed. Example merchant type and/or MCC rules may specify types of merchants and/or MCCs for which proposed transactions will be allowed. Example geographical rules may establish geographical areas associated with a wide variety of different purposes, such as the allowance of a proposed transaction, the applicability of an incentive, and/or the applicability of other rules (e.g., monetary amount rules, etc.). Example transaction amount rules may establish various monetary thresholds associated with a wide variety of purposes, such as the allowance of a proposed transaction (e.g., a transaction under $50 at an out-of-network merchant will be allowed, etc.), the applicability of other rules, and/or the applicability of an incentive offer (e.g., a transaction utilizing a particular MCC that is above a designated amount will qualify for an incentive, etc.). Example monetary amount rules may look at monetary amounts other than a transaction amount, such as historical transaction amounts and/or average transaction amounts for a consumer. For example, if a historical consumer transaction exceeds a threshold value, then an incentive or other processing rules may be applicable to a proposed transaction. Example temporal rules may specify various time constraints for the acceptance of a transaction and/or the applicability of other rules (e.g., a transaction at a designated merchant within a designated time period (e.g., 30 days, etc.) following the delivery of an earlier incentive qualifies for a discount, etc.). Other rules may specify conditions for awarded and/or applying an incentive (e.g., a discount, a cash-back incentive, a loyalty points incentive, etc.). Indeed, a wide variety of different types of issuer rules may be utilized as desired in various embodiments of the disclosure. Additionally, a wide variety of rule combinations may be applicable to various proposed transactions.

Additionally, in certain embodiments, a consumer may define one or more rules preferences, and/or parameters associated with various payment accounts of the consumers. The consumer payment accounts may be associated with a wide variety of different issuers and/or merchants. In certain embodiments, a consumer may establish a wide variety of different rules and/or preferences associated with the selection of an account to be utilized in association with a proposed transaction. For example, the consumer may establish various merchant, merchant type, geographical, temporal, and/or monetary amount rules associated with the selection of a payment account for a proposed transaction. As one example, the consumer may specify a particular payment account to utilize (if supported) at grocery stores. As another example, the consumer may specify a particular payment account to utilize for transactions that exceed a threshold amount. In certain embodiments, the consumer may establish rules based upon a review of various incentives offered by merchants. For example, a consumer may establish rules in order to take advantage of an offered incentive. Additionally, in certain embodiments, the consumer may establish rules in association with a wide variety of different payment devices, such as a payment card, a contactless payment device, and/or a transaction-enabled mobile device. For example, the consumer may specify that when a first payment device is utilized, a first set of rules will be applied, while a second set of rules is utilized for a second payment device. As one example, the customer may specify that a particular payment account will be utilized if a payment device (e.g., payment card, etc.) is utilized at a designated merchant. Indeed, the consumer has flexibility to establish a wide variety of different rules and/or combinations of rules that will be evaluated in conjunction with proposed transactions.

The transaction processing module 147 may include any number of suitable software modules and/or applications that facilitate the storage of transaction processing rules and/or parameters, as well as the evaluation of proposed transactions. In operation, the transaction processing module 147 may direct the operations of a host module (e.g., the Web server) to facilitate the receipt a wide variety of different transaction processing rules from issuers, merchants, and/or consumers. The transaction processing module 147 may evaluate received rules, resolve conflicts between the rules, and/or establish a hierarchy for applying the rules to a proposed transaction. The transaction processing module 147 may then direct storage of the rules in one or more suitable databases 148.

The transaction processing module 147 may also be configured to receive information associated with a proposed transaction. For example, proposed transaction information may be received from a merchant computer or device 110 (e.g., a merchant point of sale device, etc.). As another example, proposed transaction information may be received from a merchant acquiring platform 155 or merchant gateway associated with a merchant computer 110. Following receipt of a proposed transaction, the transaction processing module 147 may identify one or more applicable rules, and the transaction processing module 147 may evaluate the proposed transaction utilizing the applicable rules. In this regard, the transaction processing module 147 may determine whether the proposed transaction may be routed to an issuer for approval and/or settlement processing. Alternatively, the transaction processing module 147 may determine a payment account to utilize in association with the proposed transaction. Indeed, the transaction processing module 147 may function as a cloud-level module that facilitates the decoupling of transaction processing rules from a payment account issuer.

A few examples of the operations that may be performed by the transaction processing module are described in greater detail below with reference to FIGS. 2-4.

With continued reference to the service provider computer 105, the one or more I/O interfaces 142 may facilitate communication between the service provider computer 105 and one or more input/output devices; for example, one or more user interface devices, such as a display, a keypad, a mouse, a pointing device, a control panel, a touch screen display, a remote control, a microphone, a speaker, etc., that facilitate user interaction with the service provider computer 105. The one or more network interfaces 143 may facilitate connection of the service provider computer 105 to one or more suitable networks, for example, the network(s) 125, 130, 135 illustrated in FIG. 1. In this regard, the service provider computer 105 may receive and/or communicate information to other components of the system 100.

With continued reference to FIG. 1, any number of merchant computers 110 may be provided. In certain embodiments, a merchant computer 110 may be a suitable point-of-sale ("POS") device (e.g., a POS terminal) located at a physical merchant location. In other embodiments, a merchant computer 110 may be a suitable server that facilitates the processing of online purchase transactions. As desired, each merchant computer 110 may include any number of processor-driven devices, including but not limited to, a server computer, a mainframe computer, one or more networked computers, a desktop computer, a personal computer, a laptop computer, a mobile computer, or any other processor-based device. A merchant computer 110 may utilize one or more processors 160 to execute computer-readable instructions that facilitate the processing of transaction requests, the generation of proposed transactions, and/or the communication of proposed transactions to a processing entity (e.g., an acquiring platform, a service provider computer 105, etc.). As a result of executing these computer-readable instructions, a special purpose computer or particular machine may be formed that facilitates the generation and/or output of proposed transactions. Additionally, in certain embodiments, a merchant computer 110 (which may or may not be located at a POS) may utilize the one or more processors 160 to execute computer-readable instructions that facilitate the provision of issuer and/or merchant rules to the service provider computer 105.

In addition to having one or more processors 160, the merchant computer 110 may further include and/or be associated with one or more memory devices 161, consumer device readers 162, input/output ("I/O") interface(s) 163, and/or network interface(s) 164. The memory 161 may be any computer-readable medium, coupled to the processor(s) 160, such as random access memory ("RAM"), read-only memory ("ROM"), and/or removable storage devices. The memory 161 may store a wide variety of data files 165 and/or various program modules, such as an operating system ("OS") 166, and/or a transaction module 167. The data files 165 may include any suitable data that facilitates the operation of the merchant computer 110 and/or interaction of the merchant computer 110 with one or more other components of the system 100. For example, the data files 165 may include acquiring platform information, service provider information, and/or routing information for proposed transactions. The OS 166 may be suitable module that facilitates the general operation of the merchant computer 110, as well as the execution of other program modules. For example, the OS 166 may be, but is not limited to, Microsoft Windows®, Apple OSX™, Unix, a mainframe computer operating system (e.g., IBM z/OS, MVS, OS/390, etc.), or a specially designed operating system. As desired, the merchant computer 110 may additionally include one or more host modules that facilitate interaction with remote consumer devices 115. For example, a suitable Web server and/or Web server module may facilitate online shopping by consumers and/or the receipt of transaction requests.

The transaction module 167 may include any number of suitable software modules and/or applications that facilitate the receipt of transaction information, the receipt of payment account information from a consumer device, the generation of a proposed transaction, and/or the output of the proposed transaction. In one example embodiment, the transaction module 167 may identify a wide variety of transaction information, such as identifiers of products to be purchased (e.g., UPC identifiers, etc.), amounts associated with the products, and/or a total transaction amount. Additionally, the transaction module 167 may receive payment account information collected from a consumer device. For example, the transaction module 167 may interact with a consumer device reader 162 to receive payment account information at a point of sale. As another example, the transaction module 167 may receive payment account information via one or more suitable networks 125, such as the Internet. Following the identification of transaction information and payment account information, the transaction module 167 may generate a proposed transaction or proposed transaction request, and the transaction module 167 may direct communication of the proposed transaction to a suitable entity for processing. For example, the proposed transaction may be output for communication to an acquiring platform 155, and the acquiring platform 155 may forward the proposed transaction to the service provider computer 105. As another example, the proposed transaction may be output for communication to the service provider computer 105. In certain embodiments, the service provider computer 105 may be associated with a particular acquiring platform 155. Alternatively, the service provider computer 105 may communicate with a plurality of different acquiring platforms. Following, the output of a proposed transaction, the transaction module 167 may receive and process a wide variety of responses, such as an approval of the proposed transaction, a denial of the proposed transaction, and/or messages associated with applied rules and/or identified incentives.

With continued reference to the merchant computer 110, one or more consumer device readers 162 may be provided in certain embodiments. A consumer device reader 162 may facilitate communication with a consumer device at a point of sale. For example, a consumer device reader 162 may facilitate the reading of payment account information from a consumer device. A wide variety of different types of consumer device readers may be utilized as desired in various embodiments of the disclosure, including but not limited to, magnetic stripe readers, radio frequency readers, near field communication readers, etc. In certain embodiments, a reader 162 may be incorporated into the merchant computer 110. In other embodiments, a reader 162 may be in communication with the merchant computer 110.

The one or more I/O interfaces 163 may facilitate communication between the merchant computer 110 and one or more input/output devices; for example, one or more user interface devices, such as a display, a keypad, a mouse, a pointing device, a control panel, a touch screen display, a remote control, a microphone, a speaker, a consumer device reader 162, etc., that facilitate user interaction with the service provider computer 105. The one or more network interfaces 164 may facilitate connection of the merchant computer 110 to one or more suitable networks, for example, the network(s) 125, 135 illustrated in FIG. 1. In this regard, the merchant computer 110 may receive and/or communicate information to other components of the system 100.

Additionally, with continued reference to FIG. 1, any number of consumer devices 115 may be provided. Examples of suitable consumer devices 115 include, but are not limited to, transaction cards, contactless transaction devices (e.g., transaction devices including a contactless chip, etc.), mobile devices (e.g., mobile phones, smart phones, etc.), and/or personal computers. Certain consumer devices 115, such as mobile devices and/or personal computers, may be utilized by a consumer to provide consumer rules and/or preferences to the service provider computer 105. For example, a consumer may utilize a consumer device 115 to access a Web server 150 that presents one or more Web pages that facilitate the provision of rules and/or parameters to the service provider computer. Additionally, various consumer devices 115 may facilitate the provision of payment account information to a merchant computer 110 in association with a proposed transaction. For example, a payment card, contactless device, or a transaction-enabled mobile device (e.g., a mobile device including NFC or other contactess technology) may be presented at a point of sale to provide payment account information to a merchant computer 110. As another example, a personal computer or mobile device may be utilized to access a Web site of the merchant via one or more suitable networks 125 (e.g., the Internet, a cellular network, etc.) and a purchase transaction may be requested. During a purchase request, various payment account information may be provided to a merchant computer 110 by the consumer device 115. As desired, certain consumer devices 115 may be processor-driven devices that include components similar to those described above for the service provider computer 105 and/or the merchant computer 110. For example, certain consumer devices 115 may include one or more processors, memory devices, I/O interfaces, and/or network interfaces.

With continued reference to FIG. 1, any number of issuer and/or financial institution systems 120 may be provided. An issuer system 120 may facilitate the backend processing of a proposed transaction. For example, an issuer system 120 may facilitate the approval and/or settlement of a proposed transaction. In certain embodiments, a proposed transaction may be routed to an issuer system 120 via a suitable transaction network 135, and the issuer system 120 may evaluate the proposed transaction. An approval or rejection of the proposed transaction may then be output for communication to a merchant computer 110. The issuer system 120 may then facilitate the settlement of the proposed transaction.

Additionally, as desired in various embodiments, an issuer system 120 (which may or may not be associated with a merchant) may provide a wide variety of rules and/or parameters to the service provider computer 105. For example, rules may be provided to an associated Web server 150 via one or more suitable networks 130. As another example, rules may be provided via an interprocess communication and/or via any number of suitable communication techniques. As desired, an issuer system 120 may be or may include any number processor-driven devices that include components similar to those described above for the service provider computer 105 and/or the merchant computer 110. For example, an issuer device 120 may include one or more processors, memory devices, I/O interfaces, and/or network interfaces that facilitate the operations of the issuer device 120.

A wide variety of suitable networks 125, 130, 135 may be utilized in association with embodiments of the disclosure. Certain networks 125, 130 (which may be the same network or different networks) may facilitate the communication of rules to the service provider computer 105 and/or the communication of transaction requests (e.g., eCommerce requests) from the consumer devices 115 to merchant computers 110. These networks 125, 130 may include any telecommunication and/or data network, whether public, private, or a combination thereof, including a local area network, a wide area network, an intranet, an internet, the Internet, intermediate handheld data transfer devices, a publicly switched telephone network ("PSTN"), a cellular network, and/or any combination thereof and may be wired and/or wireless. Other networks 135 may be suitable transaction networks that facilitate the routing of proposed transactions. These transaction networks 135 may include branded networks (e.g., a VISA network, etc.), debit and/or PIN networks, and/or a wide variety of other suitable transaction networks. Due to network connectivity, various methodologies as described herein may be practiced in the context of distributed computing environments. It will also be appreciated that the various networks may include a plurality of networks, each with devices such as gateways and routers for providing connectivity between or among networks. Additionally, instead of, or in addition to, a network, dedicated communication links may be used to connect various devices in accordance with an example embodiment.

In one example implementation of the system 100, a service provider may collect rules and/or parameters from a wide variety of different entities and/or devices, such as payment account issuers, merchants, and/or consumers. These various rules and/or parameters may be stored for subsequent use in processing proposed transactions. Following the storage of rules and/or parameters, a consumer may utilize a consumer device 115 to provide payment account information to a merchant system 110. For example, a consumer may present a payment card, contactless device, or mobile device at a merchant point of sale, and payment account information may be read from the consumer device. As another example, a consumer may provide payment account information to a merchant system 110 in association with an eCommerce or Web-based transaction. The merchant computer 110 may generate a proposed transaction, and the merchant computer 110 may output the proposed transaction for communication to the service provider computers 105 either directly or via one or more other entities, such as an acquiring platform 155. The service provider computers 105 may utilize at least a portion of the stored rules to process the proposed transaction, and the service provider computers 105 may optionally direct the routing of the proposed transaction to a suitable and/or identified issuer or financial institution system for authorization and/or settlement. As a result, the application of processing rules may be decoupled from an issuer of a payment account. Accordingly, it may be possible to utilize closed loop payment accounts in association with other merchants. Additionally, a wide variety of other processing rules and/or parameters may be applied to a proposed transaction in order to determine whether a payment account is appropriate and/or to select a payment account to be utilized.

The system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. Accordingly, embodiments of the disclosure should not be construed as being limited to any particular operating environment, system architecture, or device configuration.

Operational Overview

Figure 2:
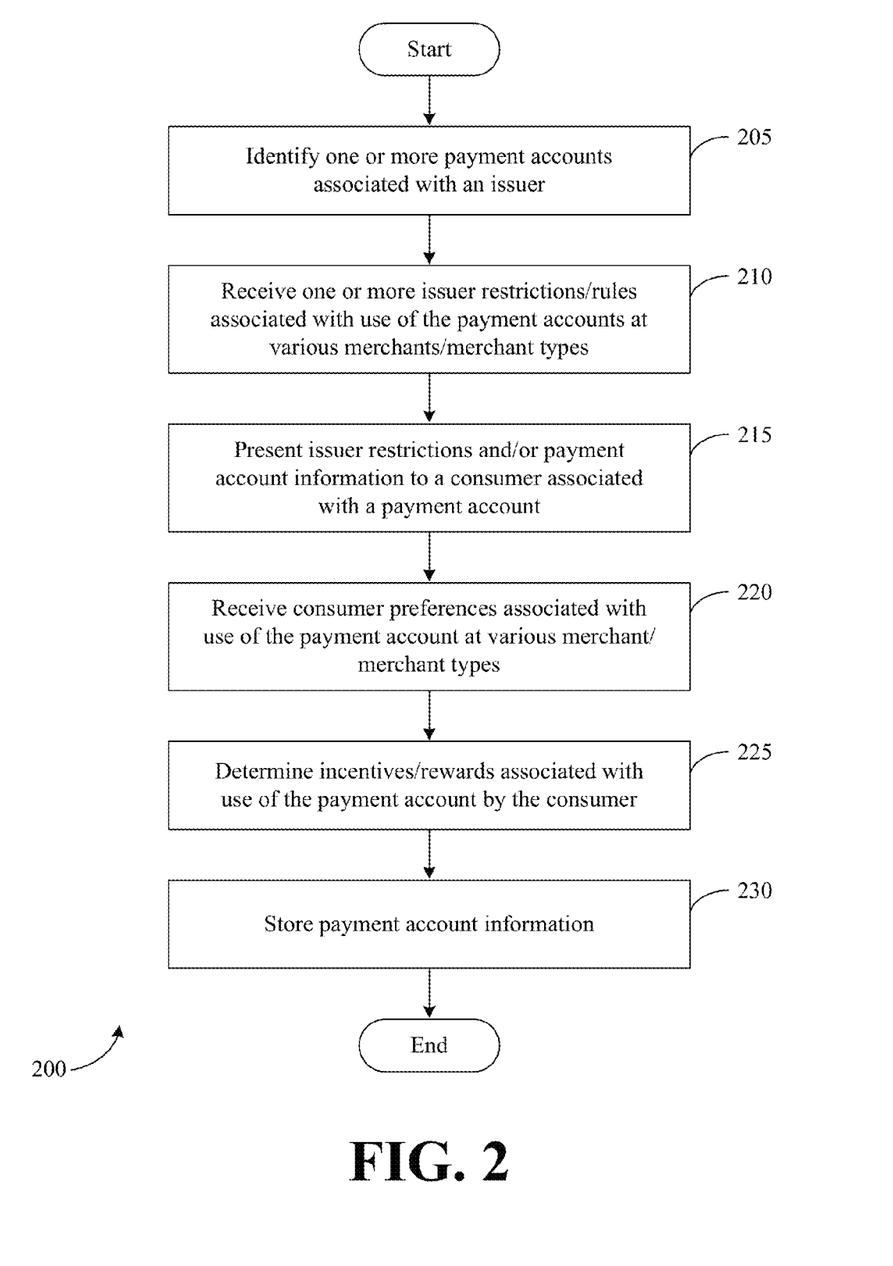
FIG. 2 illustrates a flow diagram of an example process for storing restrictions and/or preferences associated with the use of a payment account, according to an example embodiment of the disclosure.

FIG. 2 illustrates a flow diagram of an example method 200 for storing rules, restrictions, and/or preferences associated with the use of a payment account, according to an example embodiment of the disclosure. In certain embodiments, the operations of the method 200 may be performed by a suitable service provider computer and/or associated Web servers, such as the service provider computer 105 and Web servers 150 illustrated in FIG. 1. The method 200 may begin at block 205.

At block 205, one or more payment accounts associated with an issuer (e.g., a payment account issuer) may be identified or determined. In certain embodiments, the payment accounts may be identified based at least in part upon information received from the issuer, such as a list of issuer payment accounts for which rules should be associated. At block 210, one or more issuer restrictions and/or rules associated with user of the identified payment accounts may be received and/or otherwise obtained. For example, one or more issuer rules may be received in a batch file communication, an interprocess communication, or another communication with an issuer (or merchant) system. As another example, an employee of an issuer may access the one or more Web servers 150, and the issuer restrictions may be entered, established, and/or modified via one or more Web pages provided by the Web servers 150. For example, one or more Web pages may provide options for defining rules associated with payment accounts, and selections of the various options may be received and processed in order to establish one or more issuer rules. Following the receipt of issuer rules, the rules may be stored for subsequent access.

As desired in various embodiments, a wide variety of different types of issuer rules may be received, obtained, and/or identified. In certain embodiments, the issuer rules may be associated with various merchants and/or merchant types (e.g., MCCs) for which transactions associated with a payment account may be processed. A wide variety of other parameters and/or conditions may be associated with the issuer rules, including but not limited to, geographical parameters, temporal parameters, transaction amount parameters, and/or other monetary amount parameters. As one example, the issuer rules may specify one or more merchants at which a payment account may be utilized and/or conditions associated with processing transactions associated with the payment account. In this regard, an issuer of a closed loop payment account may allow the payment account to be utilized at merchants outside of the closed loop. Additionally, the issuer may specify one or more conditions associated with use of the payment account at the merchants. For example, an issuer (e.g., a retailer) may allow a payment account to be utilized at grocery stores while preventing use of the payment account at competitors. As another example, an issuer may allow a payment account to be utilized at a designated merchant if the transaction amount is lower than a predetermined threshold value.

In certain embodiments, the issuer rules may specify one or more incentives and/or special offers (e.g., discounts, cash back offers, loyalty offers, etc.) associated with the issuer. The issuer rules may additionally specify one or more conditions for applying an incentive. For example, an issuer may offer loyalty points for transactions completed at particular merchants and/or merchant types, such as merchants outside of a closed loop. As another example, an issuer may typically provide for a predetermined cash back incentive (e.g., 3%, etc.) in the event that the payment account is utilized at certain types of merchants (e.g., grocery stores, pharmacies, gas stations, etc.). The issuer may then provide for an increased incentive (e.g., 5%, etc.) in the event that one or more additional conditions are met. For example, transactions for more than a predetermined threshold or transactions made within a specified time period may quality for an increased incentive. A wide variety of other incentives may be established as desired in various embodiments of the disclosure.

At block 215, payment account information and/or at least a portion of the issuer rules and/or restrictions (e.g., incentive offers, payment account limitations, etc.) may be presented to a consumer associated with a payment account. For example, a consumer may utilize a suitable consumer device to access one or more Web pages hosted by the Web server. In this regard, the consumer may identify payment accounts associated with the consumer, and the consumer may view various issuer rules and/or incentives associated with the payment accounts. At block 220, one or more consumer preferences associated with the use of the consumer's payment accounts and/or consumer payment devices (e.g., payment cards, transaction-enabled mobile devices, etc.) may be received and/or obtained. For example, the consumer may utilize various options presented by the Web pages in order to specify one or more consumer rules.

A wide variety of consumer rules may be utilized as desired in various embodiments of the disclosure. Examples of suitable consumer rules may include rules associated with various merchants at which a payment account will be utilized, rules associated with various merchant types (e.g., MCCs) at which a payment account will be utilized, geographic and/or temporal rules associated with the use of a payment account, product type rules associated with use of a payment account, and/or various transaction and/or other amount rules associated with the use of a payment account. As desired, a combination of any of these rules may be associated with a payment account. For example, the consumer may specify that transactions associated with a particular merchant over a specified time period (e.g., the next 30 days, etc.) will be facilitated utilizing a particular payment account.

Additionally, certain consumer rules may be associated with the use of various consumer payment devices. For example, the consumer may specify different rules for different payment devices, such as different payment cards and/or other payment devices (e.g., contactless devices, transaction-enabled mobile devices, specific payment applications stored on mobile devices, etc.). For example, the consumer may specify that if a particular payment device is utilized at a particular merchant or merchant type, then a certain payment account should be utilized for the transaction. Other examples will be appreciated in light of the disclosure set forth herein. Indeed, embodiments of the disclosure may provide a consumer with relatively wide flexibility in defining rules that are applicable to various types of transactions.

At block 225, a wide variety of incentives and/or rewards associated with the use of one or more consumer payment accounts may be determined and/identified. For example, correspondences and/or matches between issuer-specified conditions for incentives and consumer rules for selecting a payment account may be determined. In the event that a correspondence is found, a determination may be made that a consumer may potentially qualify for a given incentive. As desired, information associated with the determined correspondence may be stored. Alternatively, in other embodiments, incentive qualification determination may be made during the processing of proposed transaction rather than prior to the processing of a proposed transaction.

At block 230, a wide variety of payment account information may be stored by the service provider computer 105 for subsequent access during the processing of proposed payment transactions. For example, identification information for one or more payment accounts for a consumer, consumer rules associated with the payment accounts and/or various consumer devices, issuer rules associated with the payment accounts, and/or incentive determinations may be stored for subsequent access.

The method 200 may end following block 230.

Figure 3:
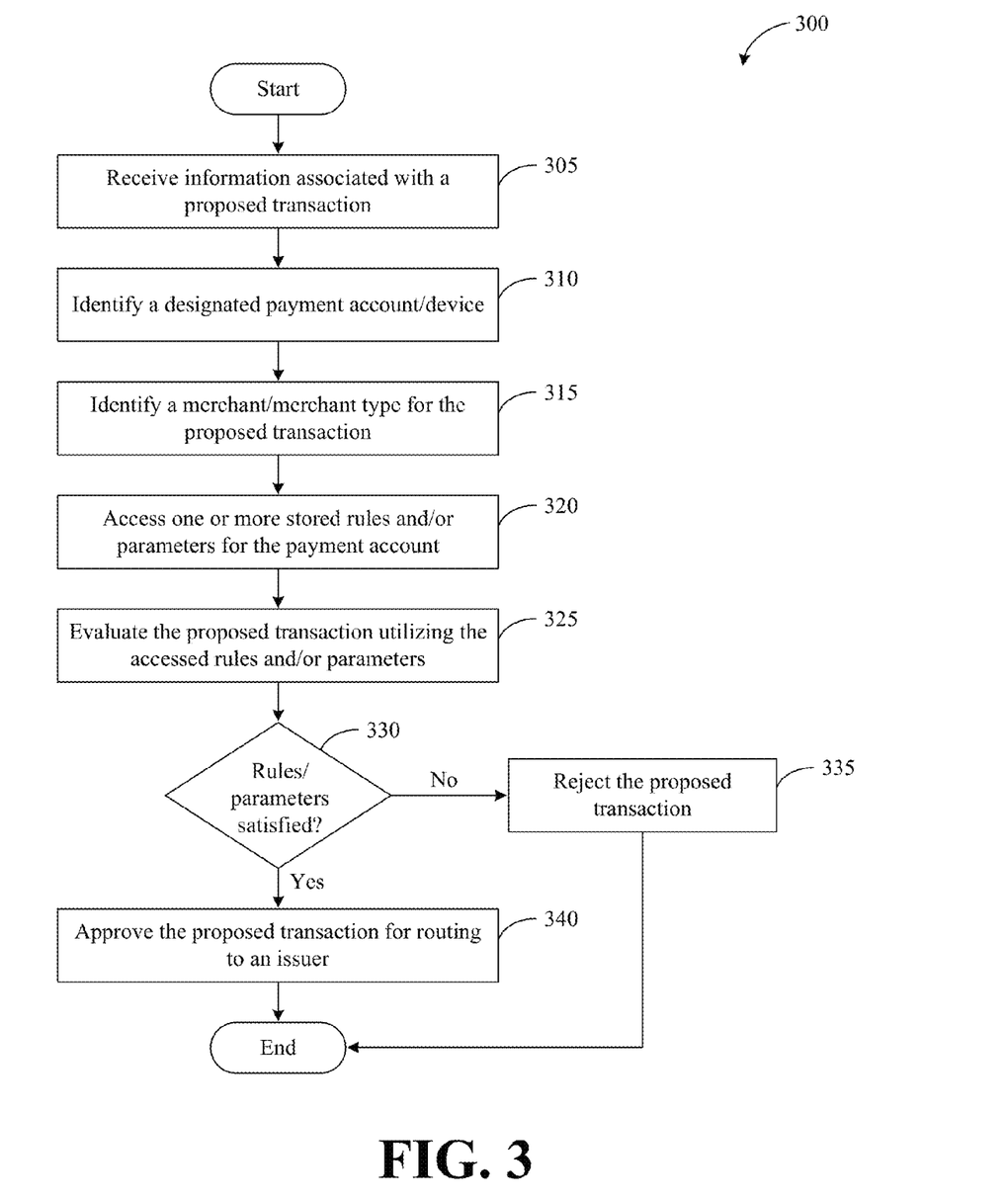
FIG. 3 illustrates a flow diagram of one example process for processing a proposed payment transaction, according to an example embodiment of the disclosure.

FIG. 3 illustrates a flow diagram of one example method 300 for processing a proposed payment transaction, according to an example embodiment of the disclosure. In certain embodiments, the operations of the method 300 may be performed by a suitable service provider computer, such as the service provider computer 105 illustrated in FIG. 1. The method 300 may begin at block 305.

At block 305, information associated with a proposed transaction may be received. The information may be received from a merchant computer, from an acquiring platform associated with the merchant, and/or from another suitable entity. A wide variety of different types of information associated with a proposed transaction may be received as desired in various embodiments, including but not limited to, merchant identification information, merchant type (e.g., MCC) information, consumer identification information, identification information for a consumer device, consumer account information, transaction amount information, and/or information associated with one or more purchased products and/or services.

At block 310, a designated payment account may be identified. For example, the received transaction information may be evaluated in order to identify a payment account number for a designated payment account. As another example, identification information for a payment device (e.g., a mobile identifier, a secure element identifier for a mobile device, etc.) may be evaluated in order to identify a designated payment account. At block 315, a merchant and/or a merchant type associated with the proposed transaction may be identified. For example, a merchant identifier and/or an MCC associated with the proposed transaction may be identified. As desired, other information associated with the proposed transaction may be identified, such as a geographical location associated with the merchant and/or the consumer, a transaction date, and/or a transaction amount.

At block 320, one or more stored rules and/or parameters associated with the designated payment account may be accessed from memory or otherwise identified (e.g., obtained from an external data source, etc.). A wide variety of rules and/or parameters may be accessed as desired in various embodiments of the disclosure, including issuer rules and/or consumer rules. At block 325, the proposed transaction may be evaluated or analyzed utilizing the accessed rules and/or parameters. For example, one or more rules associated with the use of the payment account may be compared to one or more transaction parameters. In this regard, a determination may be made as to whether the designated payment account may be utilized in association with the proposed transaction.

At block 330, a determination may be made as to whether the various rules and/or parameters have been satisfied. For example, a determination may be made as to whether the rules permit the payment account to be utilized at the identified merchant and/or in association with the designated merchant type. As another example, a determination may be made as to whether geographical, temporal, payment amount, and/or other parameters associated with the use of the payment account have been satisfied. Additionally, as desired, a determination may be made as to whether an incentive should be applied to the proposed transaction. In the event that one or more incentive rules have been satisfied, the incentive may be applied to the transaction or an indication may be associated with the proposed transaction to specify that an incentive should be applied.

If it is determined at block 330 that the various rules and/or parameters have not been satisfied, then operations may continue at block 335. At block 335, a rejection for the proposed transaction may be generated, and the generated rejection may be output for communication to the merchant device that submitted the proposed transaction. If, however, it is determined at block 330 that the various rules and/or parameters have been satisfied, then operations may continue at block 340. At block 340, the proposed transaction may be approved for routing or other communication to an issuer or financial institution system. In this regard, authorization and/or settlement of the proposed transaction may be performed by the issuer or financial institution system.

The method 300 may end following either block 335 or block 340.

Figure 4:
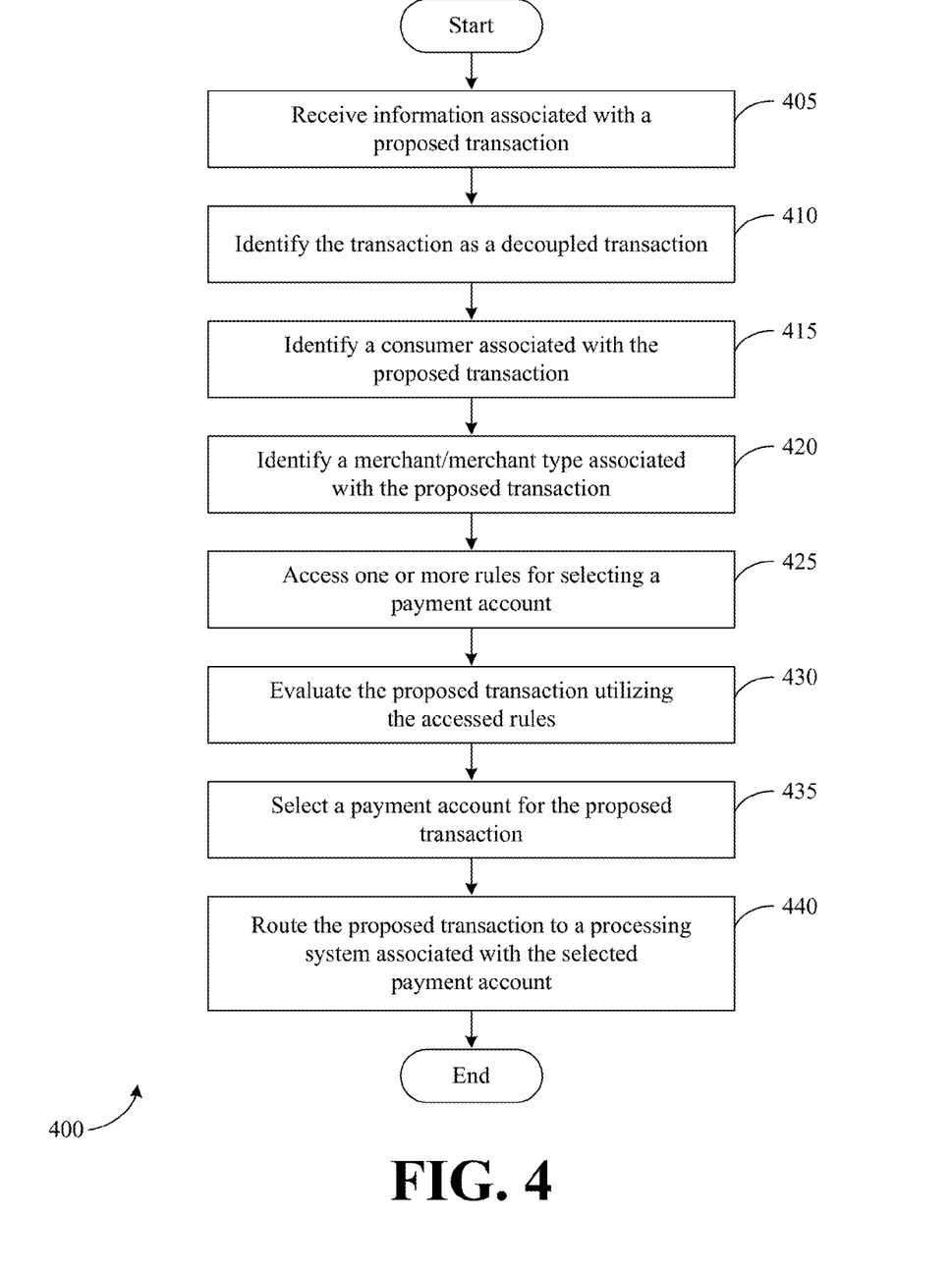

FIG. 4 illustrates a flow diagram of another example method 400 for processing a proposed payment transaction and selecting a payment account to be utilized in association with the proposed payment transaction, according to an example embodiment of the disclosure. In certain embodiments, the operations of the method 400 may be performed by a suitable service provider computer, such as the service provider computer 105 illustrated in FIG. 1. The method 400 may begin at block 405.

At block 405, information associated with a proposed transaction may be received. The information may be received from a merchant computer, from an acquiring platform associated with the merchant, and/or from another suitable entity. A wide variety of different types of information associated with a proposed transaction may be received as desired in various embodiments, including but not limited to, merchant identification information, merchant type (e.g., MCC) information, consumer identification information, identification information for a consumer device, identification information for one or more payment accounts for the consumer, transaction amount information, geographical location information for the merchant and/or the consumer, and/or information associated with one or more purchased products and/or services.

At block 410, the proposed transaction may be identified as a decoupled transaction. In other words, the proposed transaction may be identified as a transaction in which payment eligibility determinations and/or other payment conditions are decoupled from one or more payment account issuers that ultimately authorize and/or settle the proposed transaction. A wide variety of suitable methods and/or techniques may be utilized as desired to identify the proposed transaction as a decoupled transaction. For example, an identified consumer payment device and/or various received payment account information (e.g., a portion of a payment account number, etc.) may be evaluated in order to identify the proposed transaction as a decoupled transaction.

At block 415, a consumer associated with the proposed transaction may be identified. For example, identification information for a consumer payment device (e.g., a mobile device identifier, a secure element identifier, etc.) and/or received information associated with one or more payment account numbers may be utilized to identify a consumer. Additionally, at block 420, information associated with the proposed transaction may be utilized to identify a merchant and/or a merchant type (e.g., MCC, etc.) associated with the proposed transaction. As desired, a wide variety of other factors associated with the proposed transaction may also be identified, such as a transaction date and time, a geographical location of the merchant and/or the consumer, and/or a transaction amount.

At block 425, one or more rules for selecting a payment account may be accessed from memory and/or one or more external storage devices. For example, one or more consumer-specified rules associated with selecting a payment account may be accessed. Additionally, one or more issuer-specified rules associated with one or more payment accounts of the consumer may be accessed. At block 430, the proposed transaction may be evaluated utilizing at least a portion of the accessed rules. In this regard, a payment account to utilize for the proposed transaction may be selected at block 435. A wide variety of rules may be implemented in order to select a payment account for the proposed transaction. As one example, consumer payment device information (e.g., a mobile device identifier, a payment application identifier, a payment account number read from a payment device, etc.) may be utilized in conjunction with merchant information and/or other transaction parameters (e.g., geographical location, temporal parameters, amount parameters, etc.) in order to identify a payment account preference of the consumer. Additionally, one or more issuer rules may be evaluated in order to determine whether the consumer-preferred payment account is acceptable for use in conjunction with the proposed transaction. In the event that the consumer-preferred account is not acceptable, then another consumer payment account may be selected and evaluated in order to determine whether it is acceptable for use. Indeed, a wide variety of consumer and/or issuer rules may be evaluated in order to select a payment account for the proposed transaction. Additionally, a wide variety of issuer rules may be utilized to determine whether the proposed transaction qualifies for any incentives.

At block 440, the proposed transaction may be approved for routing and/or routed to a processing system associated with the selected payment account. For example, the proposed transaction may be routed to an issuer system and/or a financial institution system associated with the selected payment account. In this regard, authorization and/or settlement of the proposed transaction may be facilitated.

The method 400 may end following block 440.

The operations described and shown in the methods 200, 300, 400 of FIGS. 2-4 may be carried out or performed in any suitable order as desired in various embodiments of the disclosure. Additionally, in certain embodiments, at least a portion of the operations may be carried out in parallel. Furthermore, in certain embodiments, less than or more than the operations described in FIGS. 2-4 may be performed.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Various block and/or flow diagrams of systems, methods, apparatus, and/or computer program products according to example embodiments of the disclosure are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The claimed disclosure is:

1. A computer-implemented method for processing proposed transactions, the method comprising:
    storing, by a service provider system comprising one or more computers, one or more issuer rules associated with one or more closed loop payment accounts permitting use of the one or more closed loop payment accounts outside of a predefined closed loop network;
    receiving, by the service provider system from a merchant computer outside of the predefined closed loop network, information associated with a proposed transaction, the information comprising one of an identification of a payment account or an identification of a consumer payment device;
    evaluating, by the service provider system based at least in part on the one or more issuer rules and the information associated with the proposed transaction, the proposed transaction;
    determining, by the service provider system based at least in part upon the evaluation a closed loop payment account of the one or more closed loop payment accounts to utilize in association with the proposed transaction; and
    utilizing, by the service provider system, the closed loop payment account of the one or more closed loop payment accounts in association with the proposed transaction received from the merchant computer outside of the predefined closed loop network.

2. The computer-implemented method of claim 1, further comprising:
    storing, by the service provider system, one or more consumer rules associated with the one or more closed loop payment accounts,
    wherein evaluating the proposed transaction comprises evaluating the proposed transaction based at least in part on the one or more consumer rules.

3. The computer-implemented method of claim 1, further comprising:
    receiving, by the service provider system, the one or more issuer rules in a batch file communication or an interprocess communication.

4. The computer-implemented method of claim 1, wherein the one or more issuer rules associated with the one or more closed loop payment accounts comprise at least one of geographical parameters, temporal parameters, transaction amount parameters, monetary amount parameters or identification of one or more merchants.

5. The computer-implemented method of claim 1, wherein the one or more issuer rules associated with the one or more closed loop payment accounts comprise one or more incentives or special offers.

6. The computer-implemented method of claim 1, further comprising:
    identifying, by the service provider system, a consumer based at least in part on the information associated with the proposed transaction;
    storing, by the service provider system, the identification of the payment account or the identification of the consumer payment device associated with the consumer.

7. The computer-implemented method of claim 1, further comprising:
    determining, by the service provider system, the proposed transaction is a decoupled transaction based at least in part on the information associated with the proposed transaction.

8. A system for processing proposed transactions, the system comprising:
    at least one memory configured to store computer-executable instructions; and
    at least one processor configured to access the at least one memory and execute the computer-executable instructions to:
        store one or more issuer rules associated with one or more closed loop payment accounts permitting the use of the one or more closed loop payment accounts outside of a predefined closed loop network;
        receive, from a merchant computer outside of the predefined closed loop network, information associated with a proposed transaction, the information comprising one of an identification of a payment account or an identification of a consumer payment device;
        evaluate, based at least in part on the one or more issuer rules and the information associated with the proposed transaction, the proposed transaction;
        determine, based at least in part upon the evaluation, a closed loop payment account of the one or more closed loop payment accounts to utilize in association with the proposed transaction; and
        utilize the closed loop payment account of the one or more closed payment accounts in association with the proposed transaction received from the merchant computer outside of the predefined closed loop network.

9. The system of claim 8, wherein the at least one processor is further configured to execute the computer-executable instructions to:
    store one or more consumer rules associated with the one or more closed loop payment accounts,
    wherein evaluating the proposed transaction comprises evaluating the proposed transaction based at least in part on the one or more consumer rules.

10. The system of claim 8, wherein the at least one processor is further configured to execute the computer-executable instructions to:
    receive the one or more issuer rules in a batch file communication or an interprocess communication.

11. The system of claim 8, wherein the one or more issuer rules associated with the one or more closed loop payment accounts comprise at least one of geographical parameters, temporal parameters, transaction amount parameters, monetary amount parameters or identification of one or more merchants.

12. The system of claim 8, wherein the one or more issuer rules associated with the one or more closed loop payment accounts comprise one or more incentives or special offers.

13. The system of claim 8, wherein the at least one processor is further configured to execute the computer-executable instructions to:
   identify a consumer based at least in part on the information associated with the proposed transaction;
   store the identification of the payment account or the identification of the consumer payment device associated with the consumer.

14. The system of claim 8, wherein the at least one processor is further configured to execute the computer-executable instructions to:
   determine the proposed transaction is a decoupled transaction based at least in part on the information associated with the proposed transaction.

\* \* \* \* \*